United States Patent
Bouwman et al.

(10) Patent No.: US 10,979,642 B2
(45) Date of Patent: Apr. 13, 2021

(54) CAMERA SYSTEM FOR POSITIONING AN OPTICAL UNIT OF THE CAMERA SYSTEM

(71) Applicant: Robert Bosch GmbH, Stuttgart (DE)

(72) Inventors: Fedde Bouwman, Eindhoven (NL); Francisco Homem, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/835,427

(22) Filed: Mar. 31, 2020

(65) Prior Publication Data

US 2020/0314342 A1    Oct. 1, 2020

Related U.S. Application Data

(63) Continuation-in-part of application No. PCT/EP2019/058189, filed on Apr. 1, 2019.

(51) Int. Cl.
| | |
|---|---|
| H04N 5/225 | (2006.01) |
| H04N 5/232 | (2006.01) |
| G03B 17/56 | (2021.01) |
| G02B 27/64 | (2006.01) |

(52) U.S. Cl.
CPC ....... *H04N 5/23261* (2013.01); *G02B 27/646* (2013.01); *G03B 17/561* (2013.01); *H04N 5/2251* (2013.01); *H04N 5/2254* (2013.01); *H04N 5/23267* (2013.01); *H04N 5/23299* (2018.08)

(58) Field of Classification Search
None
See application file for complete search history.

(56) References Cited

U.S. PATENT DOCUMENTS

| | | | | |
|---|---|---|---|---|
| 4,713,697 A | * | 12/1987 | Gotou | H04N 5/23287 348/208.7 |
| 2003/0077082 A1 | * | 4/2003 | Ito | F16M 11/18 396/428 |
| 2008/0260369 A1 | * | 10/2008 | Ibaraki | H04N 5/23261 396/55 |
| 2018/0169441 A1 | * | 6/2018 | Spotts | A61B 6/03 |
| 2020/0314342 A1 | * | 10/2020 | Bouwman | G02B 27/646 |

FOREIGN PATENT DOCUMENTS

| | | |
|---|---|---|
| JP | H07200018 A | 8/1995 |
| WO | 2009137616 A2 | 11/2009 |

* cited by examiner

*Primary Examiner* — William B Perkey
(74) *Attorney, Agent, or Firm* — Michael Best & Friedrich LLP

(57) ABSTRACT

A camera system comprising an optical unit, a mounting device moveably mounting the optical unit on a mounting surface, an actuator generating an actuation movement, wherein the actuator is coupled to the optical unit and/or to the mounting device, so that the optical unit is moved relative to the mounting surface around a swivel range when the actuator is actuated, a sensor device adapted to detect orientation information, a controlling device controlling the actuator and adapted to determine a compensation movement based on the orientation information for compensation for a backlash-based relative movement between the actuator and the optical unit, wherein the optical unit comprises a center of gravity out of the swivel range, wherein the compensation movement is varied in dependence of a position of the center of gravity relative to the swivel range.

14 Claims, 2 Drawing Sheets

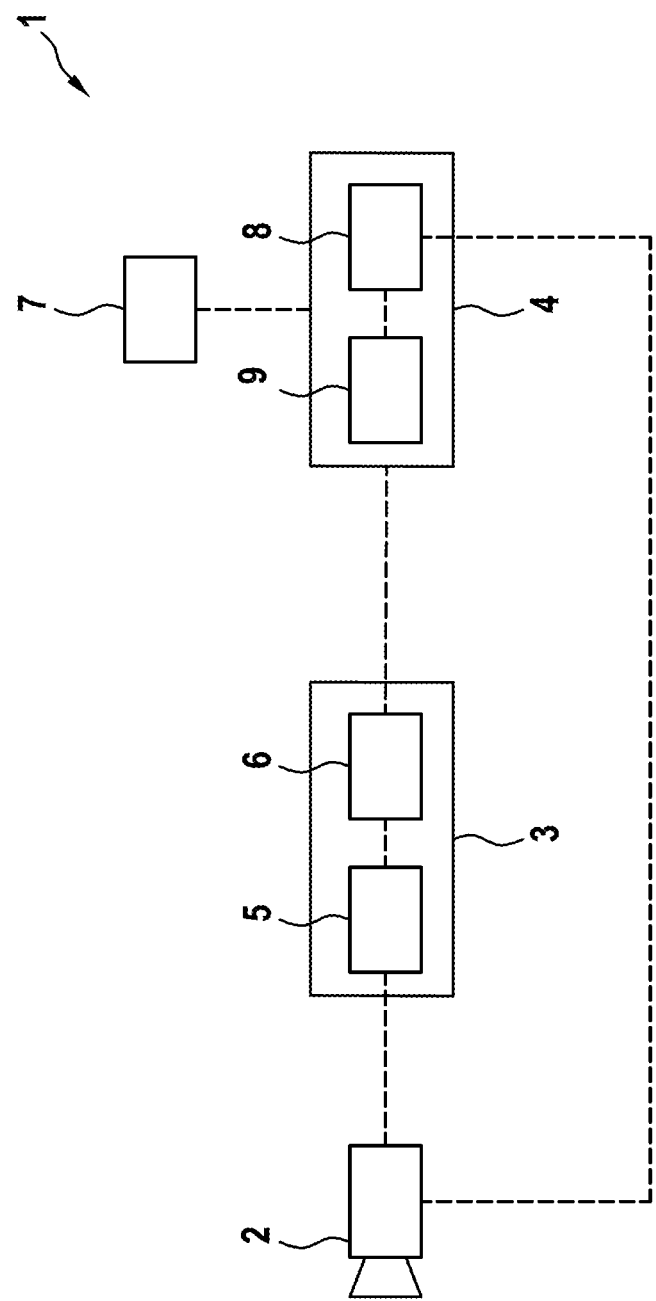

CAMERA SYSTEM FOR POSITIONING AN OPTICAL UNIT OF THE CAMERA SYSTEM

RELATED APPLICATIONS

The present application is a continuation-in-part of International Patent Application No. PCT/EP2019/058189, filed on Apr. 1, 2019, the entire contents of which is hereby incorporated by reference.

BACKGROUND OF THE INVENTION

The present invention relates to a camera system.

Camera systems are commonly known in a surveillance monitoring field. These camera systems normally comprise a camera which can be positioned by a positioning system. Due to a mechanical tolerances and gap reservation for thermal expansion of materials, the positioning system has a mechanical play. This mechanical play will cause an inaccuracy in positioning, which can be partially or fully mitigated by a backlash compensation.

The document US 2003 077 082 A1, which probably forms the closest prior art, describes a pan/tilt camera system that includes a sensor, spaced from a rotational shaft of a pan/tilt camera, a detected piece rotated with the rotational shaft so as to correspond to the sensor, an origin setting unit rotating the rotational shaft in a first direction upon turn-on of a power so that the detected piece corresponds to the sensor and thereafter, rotating the rotational shaft in a second direction opposite to the first direction so that the sensor detects a rear end of the detected piece with respect to the rotation direction of the detected piece, setting an origin, a pulse counter applying a predetermined number of pulses to the motor after set of the origin so that the rotational shaft is continuously rotated in the second direction and further so that the rotational shaft is subsequently reversed at a speed equal to the predetermined speed, the pulse counter counting pulses applied to the motor until a front end of the detected piece with respect to the rotation direction of the detected piece is detected, and a backlash calculating unit comparing a count of the pulse counter with the predetermined number of pulses applied to the motor thereby to calculate an amount of backlash of the drive mechanism. Position control of the pan/tilt camera is compensated for on the basis of the amount of backlash calculated by the backlash calculating unit.

SUMMARY OF THE INVENTION

According to the invention, a camera system is proposed which is particularly designed and/or suitable to monitor a surveillance area. The camera system can be designed as a fire alarm system and/or a burglar alarm system and/or as an access control system and/or as a video system and/or as an evacuation system.

The camera system comprises at least one optical unit. In particular, the optical unit comprises a lens which is orientated in a viewing direction. The optical unit is adapted to generate image data of the surveillance area according to its opening angle. Therefore the surveillance area captured by the optical unit is represented in form of image data or an image. The camera system is preferably suitable for an outdoor area and/or an indoor area of a building. The camera system comprises especially a number of the optical units, wherein each of the optical units is used to monitor one common surveillance area or different surveillance areas.

Furthermore, the camera system comprises an actuator which is particularly designed and/or suitable for generating an actuation movement. In particular, the actuator is used to set a pan and/or a tilt and/or a roll angle of the optical unit, especially of the lens. The actuator is coupled to the optical unit, so that the optical unit is moved around a swivel range when the actuator is actuated. The swivel range can be formed as one or more centres of articulation around which the optical unit can be panned and/or tilted and/or rolled around.

The camera system comprises at least one sensor device. The sensor device is adapted to detect an orientation information. The orientation information comprises preferably a direction of gravity, an absolute position and/or a relative orientation of the optical unit, actuator and/or the camera system, wherein relative is for example relative to the gravity direction.

The camera system comprises a controlling device for controlling the actuator. Preferably, the controlling device is designed as a digital data processing device. The controlling device can be arranged centrally. Alternatively, the controlling device can be arranged decentrally. The controlling device is adapted to determine a compensation movement based on the orientation information, so that a backlash-based relative movement between the actuator and the optical unit is compensated. In particular, the compensation movement is executed by the actuator. The controlling device is adapted to calculate the compensation movement each time when the optical unit is moved by the actuator. In particular, the sensor device is adapted to send the orientation information to the controlling device. The controlling device is adapted to analyze the orientation information, wherein the orientation information can preferably be seen as an input signal in a simplified representation. Furthermore, the controlling device is adapted to convert the input signal into an output signal, wherein the output signal includes an information about the compensation movement. The actuator executes the compensation movement preferably based on the output signal.

Within the context of the invention, it is proposed that the the optical unit comprises a center of gravity, wherein the center of gravity is arranged outside of the swivel range. In particular, the center of gravity is not aligned with the swivel range, especially with the center(s) of articulation. Due to the gravity forces on the optical unit, it can be required to change a direction of the backlash compensation based on the orientation of the camera system, especially relative to the direction of gravity, and the position of the optical unit and/or its components. For this purpose, the compensation movement is varied in dependence of a position of the center of gravity relative to the swivel range. In principle, a corresponding compensation movement can be stored in the controlling device for each orientation and/or relative position of the optical unit. Preferably, the controlling device is adapted to determine a corresponding compensation movement in dependence of the orientation information. For this purpose, the controlling device is preferably adapted to determine the position, in particular the orientation of the optical unit and/or its components, based on the orientation information, wherein a value and/or a direction of the compensation movement is calculated in dependence of the position/orientation of the optical unit.

The advantage of the invention lays in particular in the fact that, effects of mechanical play can be reduced for multiple usage scenarios. Furthermore, the influence of gravity forces on the actuator, the optical unit and/or its components can be reduced and/or compensated by the compensation movement. A further advantage is that no mechanical solution is required (e.g. a continuously spring loaded mechanical drive system) to reduce backlash-based relative movement and therefore the mechanical efficiency is higher.

Preferably, the sensor device is adapted as a stationary device. The sensor device stays for example in position and/or has a constant relative orientation to gravity direction, especially also when the optical unit and/or the actuator is moving. Especially, the sensor device is kept stationary, in orientation and/or in position after arranging and/or mounting the camera system for its use. This embodiment is based on the consideration of better reliability and easier assembly, when the sensor device is not arranged in a moving part of the camera system.

In a preferred refinement of the invention, the camera system comprises a mounting device which is particularly designed and/or suitable for moveably mounting the optical unit on a mounting surface. In particular, the mounting device is designed as a frame in which the optical unit is movably mounted. The mounting surface is preferably a ceiling or a wall of the building.

The actuator is coupled to the optical unit and/or the mounting device, so that the optical unit is moved relative to the mounting surface around the swivel range when the actuator is actuated. In particular, the optical unit can be moved relative to the mounting device, wherein the mounting device remains stationary at the mounting surface. In particular, the swivel range is defined by at least one kinematic pair which movably connects the optical unit with the mounting device. Preferably, the optical unit is designed as a surveillance camera with a fixed optical block inside a camera housing. For example the camera system is designed as a box camera or a bullet camera.

In an alternative or an optional refinement of the invention, the camera system comprises a housing, wherein the optical unit is moveably arranged inside the housing. The housing can be mounted directly on the mounting surface. Alternatively, the housing is mounted via the mounting device on on the mounting surface.

The actuator is coupled to the optical unit, so that the optical unit is moved relative to the housing around the swivel range when the actuator is actuated. In particular, the optical unit can be moved relative to the housing, wherein the housing remains stationary at the mounting surface and/or the mounting device. In particular, the swivel range is defined by at least one kinematic pair which movably connects the optical unit with the housing. Preferably, the optical unit is designed as an optical block, which is movably arranged inside the housing. The optical block comprises especially the lens and/or other components of the camera which have to be moved.

Especially, the sensor device is arranged and/or mounted in the mounting device and/or the housing. The sensor device is for example monoblock and/or firmly attached with the mounting device and/or the housing. The sensor device arranged in the mounting device and/or the housing is especially a nonmoving part of the camera system. Preferably, the sensor device is arranged and/or mounted in the mounting device and/or the housing, that after installing the camera system the sensor device is in a fixed position and/or orientation relative to gravity and/or mounting surface.

In a preferred refinement of the invention, the controlling device is adapted to determine the position of the center of gravity based on the orientation information. Principally, the controlling device is adapted to calculate the center of gravity in dependence of the orientation of the optical unit and/or of the actuator and/or of the mounting device. Optionally or alternatively, the controlling device is adapted to calculate the center of gravity based on a detected gravity force. In this case the sensor device comprises, for example, a force sensor, which is adapted to measure the gravity force acting on it, wherein the controlling device is for exampled adapted to calculate the gravity force on the optical unit, the centre of gravity and/or the actuator If the optical unit is moved (e.g. for changing the viewing direction), the center of gravity will be moved relative to swivel range, wherein the controlling device is adapted to calculate the new position of the center of gravity. In particular, the controlling device determines a current and/or a future position of the center of gravity and calculates a corresponding compensation movement. The variation of the compensation movement depends especially on the direction of movement and/or the orientation of the optical unit.

In a further practical implementation, the controlling device comprises a calculation module and a controller module. The calculation module and the controller module are coupled to each other, so that a data exchange can be realized. The calculation module is adapted to determine the compensation movement. In particular, the calculation module contains a logic to determine the position of the center of gravity relative to the swivel range based on the orientation information. If the optical unit has to be moved, the sensor device sends the current orientation information to the calculation module, wherein the calculation module preferably calculates the actuation movement including the compensation movement.

The controller module is adapted to control the actuator in consideration of the compensation movement. For this, the calculation module instructs the controller module about the actuation movement, wherein the controller module controls the actuator accordingly. If a compensation movement and/or a variation of the compensation movement is necessary, the controller module controls the actuator in consideration of the compensation movement.

In a first realization, the calculation module and the controller module are designed as two different hardware modules. In particular, the calculation module and the controller module are designed as two separate CPUs and/or two separate processing devices.

In a second realization, the calculation module and the controller module are designed as two different software modules. In particular, the calculation module and the controller module are designed as two separate software partitionings on CPUs.

In a further practical configuration, the sensor device comprises at least one inertial sensor. Particularly preferably, the sensor device includes exactly one, at least one or more inertial sensors. The inertial sensor comprises all types of sensors, which are adapted to detect the orientation information and/or position information or a position part information. In particular, the inertial sensor is an acceleration sensor and/or an angular rate sensor. Preferably, several of said inertial sensors can be combined with each other to measure an acceleration of several, especially all degrees of freedom.

The inertial sensor is preferably arranged stationary and especially on the mounting device and/or the housing, so that the detected orientation information includes an orientation of the camera system.

In a preferred arrangement, the inertial sensor is designed as a gyro sensor. In particular, at least one or all inertial sensors are designed as gyro sensors.

Preferably, the camera system comprises at least one further sensor devices. Especially, the camera system comprises two, three or four further sensor devices. The further sensor devices may be adapted as the sensor device as descripted before and/or is adapted to detect an orientation and/or position. At least one of the further sensor devices is arranged at the optical unit and/or at the actuator. Especially, the further sensor device is nonstationary arranged and/or is moved when the optical unit is moved. The further sensor device is preferably adapted to measure the orientation and/or position of the optical unit and/or the actuator. The controlling device is for example adapted to determine the compensation movement based on the detection of the further sensor device, e.g. the orientation and/or position of the optical unit.

In a further implementation, the controlling device is adapted to adjust a direction of the compensation movement in dependence of the position of the center of gravity relative to the swivel range. In particular, the calculation module is adapted to adjust the direction of compensation movement depending on the gravity force and/or the orientation of the optical unit and/or the orientation of the mounting device and/or the orientation of the actuator. Depending on the direction of the gravity force, the calculation module is adapted to determine a compensation movement, which is directed against the gravity force. Based on the orientation and/or on the position of the center of gravity, the calculation module can make a decision to change the direction of the compensation in dependence of direction of movement of the optical unit. The calculation module can change the direction of the applied compensation movement during or after the actuation movement.

In a practical constructive configuration, the actuator has at least one electrical driving device and at least one mechanical transmission device. The driving device is coupled to the optical unit via the transmission device. In particular, the transmission device is coupled with the optical block or the camera. Especially, the transmission device can be coupled with the lens and/or the housing and/or the mounting device and/or with other movable components of the optical unit. Optionally, the actuator comprises at least one further electrical driving device and/or at least one further mechanical transmission device for moving different components of the optical unit independently of each other. Preferably, the transmission device is designed as a gear and the driving device is designed as stepper motor. In particular, the driving device is controlled by the controller module. Especially, all driving devices can be controlled by one common controller module or by separate controller modules. Particularly preferably, the calculation module is adapted to control the compensation movement for more than one driving devices, especially for all driving devices.

In a further practical configuration, a motor position of the driving device is stored in the controlling device. In particular, the stored motor position includes a current and/or a future motor position of the driving device. In case of use of several driving devices, the controlling device takes into account the motor position of either the driving device under control or at least one other driving device.

The controlling device is adapted to determine at least partially the center of gravity based on the stored motor position. In particular, the orientation of the optical unit is partially derived from the known motor position(s) of the driving device(s). The calculation module can especially determine the position of center of gravity and the corresponding compensation movement based on the orientation information and the motor position. Based on the motor position, the controlling device can calculate the actuation movement including the compensation movement. Alternatively, the calculation module is adapted to determine the compensation movement and the actuation movement as two separate movement patterns, wherein the driving device executes the compensation movement after the actuation movement.

A further subject relates to a method for positioning the optical unit of the camera system as has already been described previously. The method comprises the steps:
- moving the optical unit around a swivel range by the actuator;
- detecting an orientation information by the sensor device,
- determining a compensation movement by the controlling device for compensation a backlash-based relative movement between the optical unit and the actuator, and
- varying the compensation movement in dependence of a position of the center of gravity relative to the swivel range.

The order of the steps is not fixed. In particular, the controlling device receives the command to move the optical unit, wherein the calculation module determines the actuation movement and the compensation movement. Based on the orientation information of the sensor device, the calculation module determines the position of the center of gravity. In dependence of the position of the center of gravity, the calculation module determines the direction of the compensation movement. Subsequently, the calculation module instructs the controller module about the actuation movement including the compensation movement. In a further step, the controller controls the driving device, wherein the driving device executes the actuation movement and the compensation movement simultaneously or successively.

BRIEF DESCRIPTION OF THE DRAWINGS

Further features, advantages and effects of the invention can be gathered from the following description of preferred exemplary embodiments of the invention. In the drawing:

FIG. 1 shows a schematic illustration of a camera system as an exemplary embodiment of the invention;

DETAILED DESCRIPTION

Figure 2A:
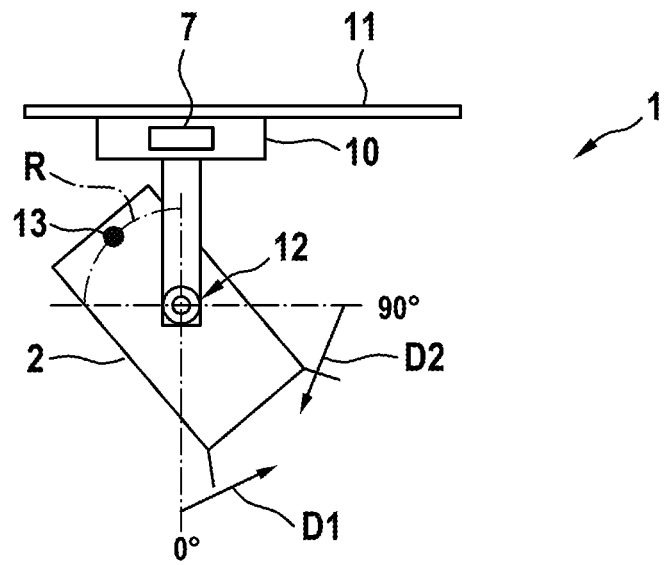
FIGS. 2a and 2b show a schematic illustration of two different mounting examples of the camera system.

FIG. 1 shows, in a highly simplified schematic illustration, a camera system 1 which, for example, is designed and/or suitable for monitoring a building. The camera system 1 comprises an optical unit 2, an actuator 3 and a controlling device 4. The optical unit 2 is formed, for example, as a video camera with a fixed optical block inside a housing or with an optical block, which is movably arranged inside a housing. The optical unit 2 can be used for recording a surveillance area and/or for detecting a fire.

The actuator 3 is designed as an electromechanical actuator, wherein the actuator 3 comprises a mechanical transmission device 5 and an electrical driving device 6. The transmission device 5 is controlled by the driving device 6, wherein the transmission device 5 converts a rotation movement of the driving device 6 into an actuation movement for the optical unit 2. For example, the actuation movement can be a pan and/or a tilt and/or a roll movement of the optical unit 2. For this, the transmission device 5 can be formed as a gear drive and/or a worm gear. For example the driving device 6 is formed as an electric motor, preferably as a stepper motor. Optionally, the actuator 3 can comprise at least one more transmission device and/or driving device, which, for example, are adapted to set a pan and/or a tilt and/or a roll and/or a zoom and/or a focus and/or an iris and/or an IR filter of the optical unit 2.

The camera systems 1 comprises a sensor device 7 for detecting an orientation information of the camera system 1 and especially or the orientation and/or position of the arranged camera system in the surrounding e.g. room. For example, the sensor device 7 can be installed in a housing of the camera system, especially on a mounting device or a central unit. With other words the sensor device is arranged stationary and is not moving with the actuator and/or when the optical unit is moved. The sensor device 7 comprises preferably a gyro sensor, so that the orientation information comprises an orientation relative to the earth gravity. Optionally, the camera system 1 comprises a further sensor device, e.g. a gyro sensor or different kind of sensors (e.g. force sensors and/or inertial sensors), wherein the further sensor is for example arranged movable and/or attached to the optical unit. This further sensor device is especially for detecting the orientation and/or the position of the optical unit The controlling device 4 comprises a calculation module 8 and a controller module 9. The calculation module 8 is adapted to determine the actuation movement of the optical unit 2, wherein the controller module 9 controls the driving device 6 based on the actuation movement. Due to mechanical tolerances and gap reservation for thermal expansion of materials, the mechanical transmission device 5 has a mechanical play. The calculation module 8 is adapted to determine a compensation movement to mitigate the mechanical play. For this purpose, the calculation module 8 instructs the controller module 9 about the actuation movement and, if necessary, about a backlash compensation movement.

Due to the gravity forces on the actuator and the optical unit 2, in case a center of gravity is outside a swivel range of the optical unit 2, it can be required to change the direction of the compensation movement based on the orientation of the optical unit 2 and/or its components. The sensor device 7 is adapted to send the current orientation information to the calculation module 8, furthermore, the further sensor device is preferably adapted to send the detected orientation and/or position to the calculation module. Based on the orientation information, the calculation module 8 can determine the position of the center of gravity, wherein calculation module 8 can make a decision to change the direction of the applied compensation movement based on the position of the center of gravity. For example, the calculation module 8 and the controller module 9 are designed as two different processing devices, wherein the calculation module 8 is a general purpose processor and the controller module 9 is a microcontroller. Alternatively, the calculation module 8 and the controller module 9 can be designed as different software partitioning's on CPUs.

Figure 2B:
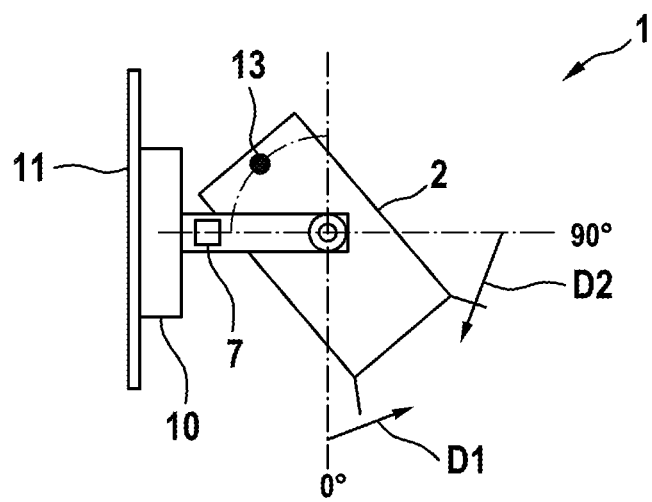

FIGS. 2a, b show, in a highly simplified schematic illustration, two different mounting examples of the camera system 1. The camera system 1 comprises a mounting device 10 for mounting the optical unit 2 on a mounting surface 11. FIG. 2a shows a ceiling mounting of the camera system 1, wherein the mounting surface 11 is a ceiling of a building. FIG. 2b shows a wall mounting of the camera system 1, wherein the mounting surface 11 is a wall of a building.

The optical unit 2 is movably mounted to the mounting device 10 around a swivel range 12. The actuator 3, which is not shown, can be coupled to the optical unit 2 and/or to the mounting device 10, so that the optical unit 2 is moved relative to the mounting surface 11 around the swivel range 12 when the actuator 3 is actuated. For example, the optical unit 2 is coupled to the mounting device 10 via a hinge or a swivel, so that the optical unit 2 can be tilted relatively to the mounting device 10 within a tilt range R. For example, the tilt range R is 90°. The mounting device 10 is fixed to the mounting surface 11, so that the mounting device 10 remains stationary when the optical unit 2 is moved.

The optical unit 2 comprises a center of gravity 13, wherein the center of gravity 13 is outside the swivel range 12. The gravity forces have an effect on the optical unit 2 in dependence of a position of the center of gravity 12 relative to the swivel range 13.

The orientation of the camera system 1 is detected by the sensor device 7. The sensor device is arranged in the mounting device 10 (FIG. 2a) or housing or a stationary part of the actuator (FIG. 2b), e.g. a suspension. The orientation and/or position of the optical unit 2 is derived from the detected orientation of the camera system 1 and from the known motor position(s) in the apparatus (driving device 6). The calculation module 8 is adapted to determine the position of the center of gravity 13 based on the orientation information. Based on the position of the center of gravity 13, the calculation module 8 varies the compensation movement. If the optical unit 2 is tilted in a first direction D1, a compensation movement is required. Based on the orientation of the optical unit 2, the decision can be made by the controlling device 3 to change the direction of the applied compensation movement. If the optical unit 2 is tilted in a second direction, which is opposite to the first direction D1, a compensation movement is not required.

In an exemplary application, the calculation module 8 (general purpose processor) contains a logic to determine the gravity direction of the driving device 6 based on the orientation information of the sensor device 7 (gyro sensor) and/or a further sensor on the optical unit 2. Based on this logic, the calculation module 8 instructs the controller module 9 (microcontroller) about the actuating movement including the backlash compensation movement. The driving device 6 (stepper motor) controls the mechanical transmission device (mechanical drive system) affecting the tilt of the optical unit 2 (e.g. a lens).

Optionally, the actuator 3 comprises multiple driving devices 6, wherein the controlling device 4 is adapted to control the direction of the compensation movement for more than one driving devices 6. Optionally, the calculation module 8 can be adapted to take current or future motor positions of the driving device 6 into account of the gyro based logic.

The invention claimed is:

1. A camera system (1) comprising
an optical unit (2),
an actuator (3) for generating an actuation movement, wherein the actuator (3) is coupled to the optical unit (2), so that the optical unit (2) is moved around a swivel range (12) when the actuator (3) is actuated,
a sensor device (7) configured to detect orientation information, and
a controlling device (4) for controlling the actuator (3), wherein the controlling device (4) is configured to determine a compensation movement based on the orientation information for compensation for a backlash-based relative movement between the actuator (3) and the optical unit (2), and wherein the optical unit (2) comprises a center of gravity (13), wherein the center of gravity (13) is out of the swivel range (12), wherein the compensation movement is varied in dependence of a position of the center of gravity (13) relative to the swivel range (12).

2. The camera system (1) according to claim 1, characterized in that the sensor device (7) is a stationary sensor device (7).

3. The camera system (1) according to claim 1, characterized in that the camera system (1) comprises a mounting device (10) for moveably mounting the optical unit (2) on a mounting surface (11), wherein the actuator (3) is coupled to the optical unit (2) and/or the mounting device (10), so that the optical unit (2) is moved relative to the mounting surface (11) around the swivel range (12) when the actuator (3) is actuated.

4. The camera system (1) according to claim 1, characterized in that the camera system (2) comprises a housing, wherein the optical unit is moveably arranged inside the housing, wherein the actuator (3) is coupled to the optical unit (2), so that the optical unit (2) is moved relative to the housing around the swivel range (12) when the actuator (3) is actuated.

5. The camera system (1) according to claim 1, characterized in that the sensor device (7) is arranged in the mounting device (11) or the housing.

6. The camera system (1) according to claim 1, characterized in that the controlling device (4) is configured to determine the position of the center of gravity (13) based on the orientation information, wherein the controlling device (4) is configured to determine the compensation movement based on the center of gravity (13).

7. The camera system (1) according to claim 1, characterized in that that the controlling device (4) comprises a calculation module (8) and a controller module (9), wherein the calculation module (8) is configured to determine the compensation movement, and wherein the controller module (9) is configured to control the actuator (3) in consideration of the compensation movement.

8. The camera system (1) according to claim 7, characterized in that the calculation module (8) and the controller module (9) are designed as two different hardware modules or software modules.

9. The camera system (1) according to claim 1, characterized in that the sensor device (7) comprises at least one inertial sensor.

10. The camera system (1) according to claim 9, characterized in that the inertial sensor is a gyro sensor.

11. The camera system (1) according to claim 1, characterized in a further sensor device for detecting an orientation and/or position, wherein the further sensor device is arranged at on the optical unit (2), so that the detected position and/or orientation includes an position and/or orientation of the optical unit (2).

12. The camera system (1) according to claim 1, characterized in that the controlling device (4) is configured to adjust a direction of the compensation movement in dependence of the position of the center of gravity (13) relative to the swivel range (12).

13. The camera system (1) according to claim 1, characterized in that the actuator (3) has an electrical driving device (6) and a mechanical transmission device (5), wherein the driving device (6) is coupled to the optical unit (2) via the transmission device (5), and wherein the driving device is controlled by the controlling device (4).

14. The camera system (1) according to claim 13, characterized in that a motor position of the driving device (6) is stored in the controlling device (4), wherein the controlling device (4) is configured to partially determine the position of the center of gravity (13) based on the stored motor position.

* * * * *